United States Patent
Bowman

(10) Patent No.: US 8,685,508 B2
(45) Date of Patent: Apr. 1, 2014

(54) PLASTICS PIPE

(75) Inventor: Jeremy Bowman, Chesterfield (GB)

(73) Assignee: Radius Systems Limited, Derbyshire (GB)

( * ) Notice: Subject to any disclaimer, the term of this patent is extended or adjusted under 35 U.S.C. 154(b) by 1160 days.

(21) Appl. No.: 10/525,095

(22) PCT Filed: Aug. 19, 2003

(86) PCT No.: PCT/GB03/03613
§ 371 (c)(1),
(2), (4) Date: Jul. 20, 2005

(87) PCT Pub. No.: WO2004/016420
PCT Pub. Date: Feb. 26, 2004

(65) Prior Publication Data
US 2006/0013980 A1    Jan. 19, 2006

(30) Foreign Application Priority Data
Aug. 19, 2002  (GB) .................................. 0219272.2

(51) Int. Cl.
B29D 22/00 (2006.01)
(52) U.S. Cl.
USPC .......................................... 428/35.7; 428/34.1
(58) Field of Classification Search
USPC ................ 525/240; 524/127, 312; 428/36.91, 428/36.6, 36.7, 475.8; 264/45.9
See application file for complete search history.

(56) References Cited

U.S. PATENT DOCUMENTS 4,600,615 A    7/1986  Hyodo et al.
4,606,953 A *  8/1986  Suzuki et al. ................. 138/143
5,759,461 A *  6/1998  Jarvenkyla et al. .......... 264/45.9
6,127,662 A * 10/2000  Katz ............................. 219/544
6,565,938 B1 * 5/2003  Toyosumi et al. ........... 428/36.6
6,825,280 B1 * 11/2004 Hayakawa et al. ........... 525/240

FOREIGN PATENT DOCUMENTS

| DE | 3312058 | 5/1984 |
|---|---|---|
| EP | 0 604 907 | 7/1994 |
| GB | 2 297 137 | 7/1996 |
| GB | 2 297 138 | 7/1996 |
| GB | 2 300 456 | 11/1996 |
| GB | 2 323 556 | 9/1998 |
| WO | 93/00212 | 1/1993 |

OTHER PUBLICATIONS

Flick, E.W. Plastics Additives—An Industrial Guide, 1993, William Andrew Publishing/Noyes, 2nd Edition, XXIV Waxes.*
International Search Report; PCT/GB03/03613; Dec. 5, 2003; I. Kanetakis.
GB Search Report; 0219272; Feb. 19, 2003; D.J. Huzley.

* cited by examiner

*Primary Examiner* — Ellen S Raudenbush
(74) *Attorney, Agent, or Firm* — Fish & Richardson P.C.

(57) ABSTRACT

A plastics pipe which comprises an inner core and an outer removable skin layer bonded thereto, the outer removable skin layer comprising a polymeric material, chosen for its physical and mechanical properties, and an adhesion-modifying additive, the adhesion-modifying additive being present in the skin layer in an amount such that the adhesion of the skin layer to the inner core is sufficient to prevent substantial undesired relative movement between the skin layer and the core during installation, but insufficient to prevent the outer skin layer from being cleanly removed by peeling, at least at the ends of the pipe, and insufficient to cause a substantial reduction in the impact strength of the inner core.

15 Claims, 2 Drawing Sheets

PLASTICS PIPE

This invention relates to plastic pipes and more particularly to a novel composite plastics pipe, a method for its manufacture, and a method for making joints in such a pipe.

In the handling, installation and connection of plastics pipes, the pipe surface is easily damaged. In "no-dig" plastics pipe installation techniques, for example, a tunnel is bored in the ground for the pipe and the pipe is then pushed or pulled through the tunnel into an excavated hole where the next pipe joint is to be made. Installation techniques such as pipe-bursting and slip lining can also place extreme stress on the pipe surface.

Other modern pipe laying methods can also subject the pipe to substantial bending and tensile forces, both of which can result in a deterioration of the mechanical strength of the pipe. In addition, the useful life of the pipe may be reduced by diffusible materials in the ground, or by environment conditions, for example, exposure to direct sunlight for long periods.

Of greatest concern, is that modern pipe laying methods can result in the pipe becoming scratched and dirty. This is disadvantageous firstly as the pipe material may be notch sensitive, in which case any scratches may cause greater damage to occur in the pipe during subsequent handling or use. Secondly, dirt and/or oxidation on the pipe surface may prevent successful welding. The main reason for failure of joints using an electrofusion fitting is that the surface of the pipe is dirty or has become oxidised. For this reason, until recently, the pipe ends always have had to be cleaned and scraped before jointing, for example, with a hand or mechanical scraper. In practice, the cleaning and scraping is often uneven (the underside of the pipe in particular may be treated less carefully), and the quality of the end result depends upon the professional skill of the installer.

In recent years there have been proposals to provide the pipe with a non-adherent skin layer which can be removed in order to permit jointing. Composite pipe constructions of this type are described, for example, in JP3-24392, EP0474583, EPO 604907, GB2323556, GB2300456, and WO93/00212. The entire disclosures of all these patents are incorporated herein by reference for all purposes.

All of these prior art pipe constructions suffer from the disadvantage that modern pipe laying techniques tend to cause wrinkling, rucking, or at least undesired movement of the non-adherent skin layer relative to the core when the pipe is pushed through the around. These proposals have therefore not proved commercially acceptable.

More traditional proposals, wherein a protective skin layer is provided which is strongly adherent to the pipe, do not, of course, overcome the problem of dirt and oxidation on the outer surface, since such skin layers are very difficult to remove without elaborate equipment. The presence of a tightly adherent skin layer can also dramatically lower the impact strength of the plastics pipe.

The first appreciation that the above problems could be solved by using a protective skin layer which is only lightly adherent to the core pipe occurs in GB2297137 and GB2297138, the entire disclosures of which are incorporated herein by reference for all purposes.

In GB2297138, for example, there is provided a plastics pipe which comprises an inner core and an outer protective layer bonded thereto, in which the dimensions of the pipe and the protective layer are such that the ratio of the external diameter of the pipe to the thickness of the protective layer is at least 70, preferably at least a 100, and the cohesive strength of the outer protective layer, excluding any lines of weakness, at least at the ends of the pipe, is greater than the strength of the adhesive bond between the outer protective layer and the inner core. According to this specification, by a correct choice of the material of the skin layer and the extrusion conditions, it is possible to provide a level of adhesion which still permits clean removal of the skin layer by peeling, whilst preventing rucking or wrinkling of the skin layer during installation and without substantially adversely affecting the mechanical properties of the pipe.

The composite pipe of UK patents GB2297137 and GB2297138 has been commercially extremely successful, but it has seen found that under specific conditions of temperature and loading it is difficult to provide a skin layer which has both the required toughness and limited adhesion to the core pipe. Quality control of the base polymer material of the skin layer, and control of the extrusion conditions during manufacture, need to be rigorously maintained if undesirable quantities of scrap are to be avoided. This substantially increases both raw material and manufacturing costs.

A novel composite plastics pipe has now been developed which has the advantages of a plastics pipe with a removable outer protective layer, but which gives improved, flexibility in choice of materials and manufacturing conditions without substantially adversely affecting the mechanical properties of the pipe.

In a first aspect, the invention provides a plastics pipe which comprises an inner core and an outer removable skin layer bonded thereto, the outer removable skin layer comprising a polymeric material, chosen for its physical and mechanical properties, and an adhesion-modifying additive, the adhesion-modifying additive being present in the skin layer in an amount such that the adhesion of the skin layer to the inner core is sufficient to prevent substantial undesired relative movement between the skin layer and the core during installation, but insufficient to prevent the outer skin layer from being cleanly removed by peeling, at least at the ends of the pipe, and insufficient to cause a substantial reduction in the impact strength of the inner core.

In a further aspect, the invention provides a method for the production of a plastics pipe comprising an inner core and an outer removable skin layer bonded thereto, the outer removable skin layer comprising a polymeric material chosen for its physical and mechanical properties, and an effective amount of an adhesion-modifying additive, which method comprises co-extruding molten polymeric materials forming the inner core and the outer removable skin layer from cone or more extruder dies, bringing the molten polymeric materials together and allowing them to cool, such that, on cooling, the adhesion of the skin layer to the inner core is sufficient to present substantial undesired relative movement between the skin layer and the core during installation of the pipe, but insufficient to prevent the skin layer from being cleanly removed by peeling, at least at the ends of the pipe, and insufficient to cause a substantial reduction in the impact strength of the inner core.

In another aspect the invention provides a method of making a joint to a plastics pipe according to the first aspect of the invention, or of joining two such plastics pipes, which comprises peeling the skin layer from the region or regions of the pipe to be joined, to expose a clean surface suitable for electrofusion jointing, installing an electrofusion fitting over the clean surface or surfaces of the pipe or pipes and activating the electrofusion fitting to fuse the region or regions of the pipe or pipes thereto.

By "undesired relative movement" in this specification is meant movement or de-bonding of the skin layer relative to the core during directional drilling, pipe bursting, slip lining, or other conventional pipe installation procedures.

By selecting the material of the skin layer con the basis of its physical and mechanical properties and then modifying its adhesive properties with an appropriate additive, we have found that it is possible to improve greatly the consistency of the resultant pipe without sacrificing quality and performance. Thus the properties of the material of the skin layer no longer have to be a compromise between conflicting requirements.

The strength of the adhesive bond between the skin layer and the inner core is preferably at least 0.1 N/mm, more preferably at least 0.2 N/mm, when measured by a rolling drum peel test as described in Appendix 1. The adhesive bond between the skin layer and the inner core is preferably less than 2.0 N/mm, more preferably less than 1.5 N/mm. Very good results have been achieved using an adhesion between the skin layer and the inner core within the range of from 0.3 to 1.5 N/mm, when measured by the above-mentioned rolling drum peel test. Without wishing to be bound to any particular theory, it is believed that the adhesion between the high molecular weight polymers of the inner bonding layer and the core is as a result of Van der Waals aid/or diffusive bonding, or similar forces.

It is likely that any adhesion between the skin layer and the inner core will have some effect upon the impact strength of the plastics pipe, and it is presumably for this reason that prior art proposals (other than GB2297137 and GB2297138) have always sought to avoid adhesion between the skin layer and the core. Nevertheless, it has been found that the combination of the tough skin layer and the light bonding used in the present invention can still produce a plastics pipe having sufficient impact strength to meet the requirements of all available standards. Moreover improved impact strength over the products of GB2297137 and GB2297138 can also be obtained. Preferably the strength of the adhesive bond between the skin layer and the inner core is such that the impact strength of the composite plastics pipe is at least 50, preferably at least 75%, more preferably at least 90% of the impact strength of the inner core without the skin layer.

The inner core and the skin layer of the composite plastics, pipe of the present invention can comprise any suitable thermoplastic polymeric materials, consistent with the maintenance of the required properties. Suitable polymeric materials include, for example, olefinically-unsaturated polymers and co-polymers, for example, polyolefins such as polyethylene, polypropylene, polybutene and polybutylene; ethylene and propylene co-polymers, for example, ethyl ene-vinyl acetate polymers, and propylene-vinyl acetate polymers; halogenated-vinyl polymers such as vinyl chloride polymers and co-polymers; polyamides, for example, nylon 6, nylon 11 and nylon 66; polycarbonates; ABS polymers and ionomer polymers such as Surlyn (RTM).

The inner core of the pipe comprises a polymeric material chosen to be compatible with the particular application, and in particular with the fluid material to be conveyed by the pipe. For many applications polyethylene is the preferred material for the inner core. The grade of polyethylene chosen, that is to say, high density, medium density, low density, or linear low density, will depend upon the particular application. Suitable grades of polyethylene for pressure pipe applications, preferably meet the requirements of at least one of prEN 12201-1 (except clause 4.2.1 and the associated pigment or carbon black requirements if an unpigmented material is used), prEN12201-2 (except clause 5.2 and the associated pigment or carbon black requirements if an unpigmented material is used), prEN1555-1 (except clause 4.2.2 and the associated pigment or carbon black requirements if an unpigmented material is used) and prEN1555-2 (except clause 5.2 and the associated pigment or carbon black requirements if an unpigmented material is used).

Any suitable equivalent grade of polyethylene may, of course, also be used.

The skin layer is formed from a polymeric material or a blend of polymeric materials having goad mechanical and physical properties, especially toughness and low temperature impact strength, Preferred polymeric materials for the skin layer comprise propylene homo- and co-polymers, propylene block co-polymers, and propylene random co-polymers. Preferably the skin layer has a notched Charpy impact strength of at least 1 kJ/m$^2$, more preferably at least 2 kJ/m$^2$ and most preferably at least 4 kJ/m$^2$, when measured using the method of ISO 179/16A at a temperature of −20° C.

Under typical co-extrusion conditions, many polymer material combinations tend to adhere strongly together, and this is generally true for many grades of polyethylene and propylene polymers. In this specification, polymeric materials of the skin layer are termed "adherent polymeric materials", if, but for the presence of the adhesion seducing additive, they would adhere to the core pipe to an extent such that the outer skin layer cannot be peeled from the core pipe, or such that the impact strength of the composite plastics pipe is substantially reduced, or both, when the core pipe and the skin layer are extruded under typical extrusion conditions. In such cases the skin layer will need to comprise an appropriate amount of an adhesion-reducing additive.

The quantity of adhesion-reducing additive in the polymeric material of the skin layer is preferably such that the adhesion to the inner core is below 2.0N/mm and preferably below 1.0N/mm when measured using a rolling drum peel test as described in Appendix 1. The actual quantity of adhesion-reducing additive in the skin layer depends on the additive used, but in general is within the range of from 0.0001% to 15% by weight, more preferably from 0.5% to 15% by weight and most preferably from 1.0% to 8% by weight.

The adhesion-reducing additive is desirably one that has little or no effect on the mechanical and physicaL properties of the polymeric material of the skin layer. Preferred adhesion-reducing additives include esters, and, for example, one class of preferred esters includes esters of polyhydric alcohols such as ethane-1,2-diol, 2,2-dimethyl-1,3-propanediol (neopentyl glycol), 2-methyl-2-propyl-1,3-propanediol, 2-butyl-2-ethyl-1,3-propanediol, 2-butyl-2-methyl-1,3-propanediol, 1,3-propanediol, 2-methyl-1,3-propanediol, 1,2-pentanediol, 1,6-hexanediol, 3-hexyne-2,5-diol, 2,5-dimethyl-3-hexyne-2,5-diol, 1,10-decanediol, 2,2-bis(4-hydroxycyclohexyl) propane, 1,4-bis (hydroxymethyl) cyclohexane, 2,2,4-trimethyl-1,3-pentanediol, glycerol (propane-1,2,3-triol) trimethylolethane, trimethylolpropaner ditrimethylolpropane, peritaerythritol, dipentaerythritol, tripentaerythritol, sorbitol and mannitol.

Another class of preferred esters includes esters off fatty acids such as decanoic acid, docosanoic acid, dodecanoic acid (lauric acid), hexadecanoic acid (palmitic acid), octadecanoic acid, octanoic acid (caprylic acid), oleic acid, linoleic acid, linolenic acid, octadecanoic acid (stearic acid), behenic acid, erucic acid, myristic acid, nonanoic acid, and ricinoleic acid.

Examples of preferred esters of polyhydric alcohols include glycerol esters with erucic acid, stearic acid, lauric acid, linoleic acid, myristic acid, oleic acid, palmitic acid, ricinoleic acid ad behenic acid. Particularly good results have been achieved with glycerol mono-stearate, which is one of the most preferred adhesion-reducing additives for use in the present invention.

Examples of preferred esters of fatty acids include hexadecanoic acid, 2,3,-bis [(trimethylsilyl)oxy]propyl ester and octadecanoic acid, 2,3,-bis [(trimethylsilyl)oxy] propyl ester.

Another class of preferred esters includes cyclic esters of hydroxycarboxylic acids, for example, γ-butyrolactone, which is the cyclic ester of 4-hydroxybutyric acid.

Yet another class of preferred adhesion reducing additives includes acid anhydrides, for example, propanoic acid 2-methyl anhydride.

A still further class of adhesion-reducing additives that can be used includes fatty acid amides, for example oleamide, stearamide, erucamide, behenamide and ethylene-bis-stearamide. Excellent results have been obtained using stearamide, erucamide and ethylene-bis-stearamide, and these are further examples of most preferred adhesion-reducing additives for use in the present invention.

Yet another class of adhesion-reducing additives that can be used includes ethoxylated amines and esters.

Yet another adhesion-reducing additive that can be used is polybutylene.

Mixtures of any of the abovementioned adhesion-reducing additives may be used where compatible in any suitable combinations, proportions and amounts.

A particularly preferred plastics pipe according to the present invention comprises an inner core of polyethylene and a skin layer of a propylene block co-polymer comprising from 2% to 4% of a glycerol ester as an adhesion-reducing additive.

Preferably the impact strength of a 90 mm outside diameter plastics pipe having a polyethylene inner core and a polypropylene skin layer with an SDR of 17.0 is greater than 300 joules when measured using the method of EN1411:1996 at a temperature of −10° C. using a 90 mm diameter tup for impacting the pipe.

The adhesion-modifying additive is preferably added to the polymeric material of the skin layer as a masterbatch. The masterbatch preferably comprises from 1% to 50% by weight of the adhesion-modifying additive, more preferably from 2% to 30% by weight.

In general, the use of processing aids, including metal stearates, such as calcium stearate, has been found to be ineffective in reducing adhesion and should be avoided.

While the invention has been found to be particularly applicable to combinations of adherent polymeric materials and adhesion-reducing additives, in principle it could also be applied to no-adherent polymeric materials, whereupon the adhesion-modifying additive would need to be an adhesion-promoting additive.

An advantage of the plastics pipes of the present invention is that the normal UV stabiliser and colorant package need not be included in the plastics material of the inner core, provided that sufficient quantities of these materials are included in the skin layer. This enables the inner core to comprise a natural polymeric material, free or substantially free from additives which add to the cost of the core material and which, in certain circumstances, may impair the mechanical or physical properties of the core material. Alternatively, stabilisers can be included in the core material, but the outer protective skin layer can be coloured to indicate the underlying grade of pipe and/or the fluid being transported by the pipe.

Suitable stabiliser or ultra-violet blocking additives for the outer protective skin include, for example, titanium dioxide, carbon black, and other fillers. Whilst carbon black is an excellent UV stabiliser and reinforcing filler, buried pipes are frequently colour coded and its use in the outer protective layer is therefore not possible for many applications. Titanium dioxide is, therefore, the preferred filler and UV stabiliser since this is also compatible with many colorant packages. Other filler materials, such as chalk and talc, may also be used. The preferred filler particle size is dependent on the filler being used, but for titanium dioxide, for example, the average particle size range is preferable from 0.003 to 0.025 microns.

The skin layer and the inner core can, of course, each comprise more than one layer of polymeric material, although in practice this is not usually necessary.

The relative thickness of the skin layer and the dimensions of the pipe have also been found to affect the impact resistance of the pipe. This is discussed in GB 2297138. Preferably the skin layer has a thickness of greater than 0.1 mm, more preferably greater than 0.2 mm, and most preferably within the range of from about 0.3 mm to 2.0 mm.

The dimensions of the pipe and the protective layer are preferably such that the ratio of the external diameter of the pipe to the thickness of the skin laser is at least 70, more preferably at least 100, most preferably in the range 100 to 800. From this it can be seen that it is possible to use a thicker skin layer on a pipe of greater diameter.

When stripping the skin layer from the pipe, it is important that no residue or holidays should be left on the pipe surface that could interfere with the electrofusion jointing process. Thus conventional adhesives and skin layers that are prone to tearing or fragmentation should be avoided. In general the force required to rupture the skin layer should be greater than the force required to peel the skin layer from the inner core.

By "a clean surface" in this specification is meant a pipe surface that can be subjected to electrofusion jointing without further preparation or treatment. Such surfaces should give rise to a quality of electrofusion joint that meets the requirements of one or more of pr EN12201 part 3, pr EN1555 part 3 and WIS 04-32-14.

The composite plastics pipe of the present invention is preferably produced by co-extrusion, wherein the polymeric materials are brought together in the pressure area of the die and exit as a single extrudate. For example, the die may be connected to one, two, or more extruders and fed with separate streams of molten material. Alternatively, the die may be provided with concentric die outlets fed with separate streams of molten polymeric materials which are to form the inner core and the skin layer. In this case, the extrudates, on leaving the extruder die outlets, can be brought into contact with each other whilst still molten, preferably in a sizing die which simultaneously adjusts the outer diameter of the pipe.

In a further alternative, the inner core extrudate may be passed through a sizing die before applying the skin layer. In this case it may be necessary to re-heat or flame-brush the surface of the inner core extrudate to create a surface ready to receive the skin layer. Because of the difficulty of maintaining a consistent adhesion between the inner core and the skin layer, and of keeping the core surface clean (prior to coating with the skin), this method is not presently preferred.

The method of the invention is illustrated by the following Examples:

EXAMPLE 1

A polyethylene core pipe of nominal outer diameter 90 mm was co-extruded with a propylene random copolymer skin layer. The experiment was repeated replacing the propylene random copolymer with (I) a propylene block copolymer and (II) with a blend of the copolymers, in each case with the addition of 15% by weight of a masterbatch comprising 20% by weight of a glycerol ester.

Skin adhesion was measured using a rolling drum peel test as described in Appendix 1.

The skin layers of all of the resultant pipes could be peeled readily using a simple hand tool, exposing a clean surface of the core pipe. Electrofusion jointing tests gave very good results in conformance with prEN12201 part 3, prEN1555 part 3 and WIS 04-32-14. In a comparison test, a pipe was extruded with a propylene block copolymer skin layer without the glycerol ester. The skin layer firmly adhered to the core pipe and could not be removed from the pipe by peeling.

The impact strength of the pipes was measured at −1.0° C., with and without the skin layer, using the method of EN 1411: 1996. In further experiments the pipes were notched at 90° to the point of impact prior to testing to simulate service conditions. The results are given in Table 1.

TABLE 1

| PIPE | | | |
|---|---|---|---|
| Ø(MM) -SDR | 90-17 | 90-17 | 90-17 |
| Core resin | Polyethylene | Polyethylene | Polyethylene |
| SKIN | | | |
| Propylene random copolymer | 100% | 60% | — |
| Propylene block copolymer | — | 25% | 85% |
| Masterbatch | — | 15% glycerol ester | 15% glycerol ester |
| Thickness (mm) | 0.5-1.0 | 0.79 | 0.67 |
| SKIN ADHESION | | | |
| Min(N/mm) | 0.3 | 0.79 | 1.08 |
| Mean (N/mm) | — | 1.38 | 1.55 |
| Max (N/mm) | 0.8 | 1.88 | 1.96 |
| IMPACT at −10° C. | | | |
| Un-Notched (J) | 103-324 | <400 | >588 |
| No skin, un-notched (J) | 487-588 | | |
| Notched to 0.2 mm depth (J) | 103 | 188* | 333* |
| No Skin, notched to 0.2 mm depth (J) | 387 | | |

*Passed if the skin breaks but the core remains intact.

The results show that by using an adhesion-reducing additive to reduce the bond strength of a propylene block copolymer skin layer to a polyethylene core, the impact strength of the pipe can be substantially increased when compared to a similar pipe having a propylene random copolymer skin layer, whilst the peelability of the pipe is retained.

EXAMPLE 2

The procedure of Example 1 was repeated, by extruding a polyethylene inner core and a polypropylene skin layer including a range of adhesion-reducing additives. All percentages are by weight. The same tests were carried out with the following results:

| Dev Ref | Description | | Dimensions | | | Peel Resistance | | External Impact | | |
|---|---|---|---|---|---|---|---|---|---|---|
| | Materials | | OD | SDR | Skin | Mean | Max | | Test Temp | Energy @H50 |
| | Core | Skin % | Nominal mm | | Mean mm | N/mm | N/mm | Specific | ° C. | Joules |
| 1 | P100 Polyethylene | PP 97.5 GMS 2.5 | 90 | 17 | 0.785 | 2.58 2.66 | 3.08 3.24 | notched | −10.00 | 558.97 |
| 2 | P100 Polyethylene | PP 97 GMS 3 | 90 | 17 | 0.78 | 2.26 2.49 | 2.82 2.87 | notched | −10.00 | 397.16 |
| 3 | P100 Polyethylene | PP 96.5 GMS 3.5 | 90 | 17 | 0.77 | 2.14 2.22 | 2.57 2.63 | notched | −10.00 | 523.67 |
| 4 | P100 Polyethylene | PP 96 GMS 4 | 90 | 17 | 0.6975 | 2.27 2.10 | 2.58 2.57 | notched | −10.00 | 533.96 |
| 5 | P100 Polyethylene | PP 97.5 GMS 2.5 | 90 | 17 | 0.795 | 1.66 1.66 | 2.03 2.00 | notched | −10.00 | 578.09 |
| 6 | P100 Polyethylene | PP 97 GMS 3 | 90 | 17 | 0.785 | 1.24 1.50 | 1.71 1.77 | notched | −10.00 | 465.56 |
| 7 | P100 Polyethylene | PP 96.5 GMS 3.5 | 90 | 17 | 0.7425 | 1.74 1.93 | 2.11 2.22 | notched | −10.00 | 520.73 |
| 5 | P100 Polyethylene | PP 96 GMS 4 | 90 | 17 | 0.71 | 2.35 2.15 | 2.71 2.53 | notched | −10.00 | 562.65 |
| 9 | P100 Polyethylene | PP 99 ERUCAMIDE 1 | 90 | 17 | 0.7475 | 1.82 1.87 | 2.23 2.72 | notched | −10.00 | 558.97 |
| 10 | P100 Polyethylene | PP 97 ERUCAMIDE 3 | 90 | 17 | 0.67 | 1.61 1.69 | 1.94 2.16 | notched | −10.00 | 542.05 |
| 11 | P100 Polyethylene | PP 99 STEARAMIDE 1 | 90 | 17 | 0.615 | 1.37 1.58 | 1.72 2.00 | notched | −10.00 | 558.97 |
| 12 | P100 Polyethylene | PP 97 STEARAMIDE 3 | 90 | 17 | 0.7225 | 1.64 1.67 | 1.93 1.34 | notched | −10.00 | 572.94 |
| 13 | P100 Polyethylene | PP 99 EBS 1 | 90 | 17 | 0.625 | 1.37 1.34 | 1.65 1.68 | notched | −10.00 | 571.47 |
| 14 | P100 Polyethylene | PP 97 EBS 3 | 90 | 17 | 0.595 | 1.10 1.17 | 1.38 1.40 | notched | −10.00 | 566.33 |

EBS = Ethylene-Bis-Stearamide
PP = Polypropylene block copolymer
GMS = Glycerol Mono-Stearate These results further demonstrate the improvement in impact strength and peelability obtained using the method of the present invention.

Appendix 1

Determination of the Adhesion Strength of Pipe Skin—Core Peel

Apparatus

A tensile testing machine accurate to grade A of BS5214: Part 1: 1975 or grade 1 of BS 1610: Part 1: 1985, for example, a Lloyds tensile test machine, using a 100N load cell.

Test Specimens

Two test pieces are cut one from each end of the sample pipe 10, 25mm +/−2mm wide, the two sample rings 12 of pipe are trimmed around the circumference to remove the jagged edge. The pipe is marked along top dead centre (TDC) of the extrusion line (if known).

Figure 1:
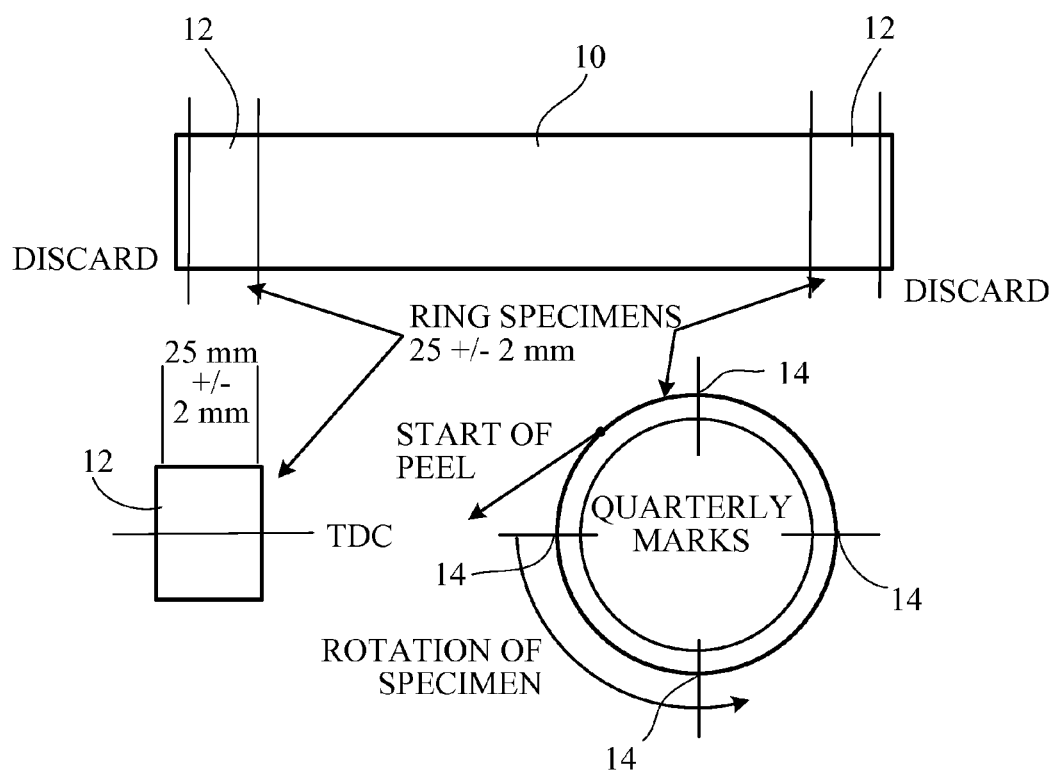
FIG. 1 is a schematic of two ring specimens.

The two ring specimens are marked with an indelible marker at quarterly points 14 around the circumference beginning at TDC (if known) as illustrated in FIG. 1.

Procedure

Cut through the skin along mark at TDC & prise edge of skin 16 from pipe, peel skin off to 30-40 mm length, feed peeled skin through the jig 18 as shown & clamp in upper jaws 20.

Figure 2A:
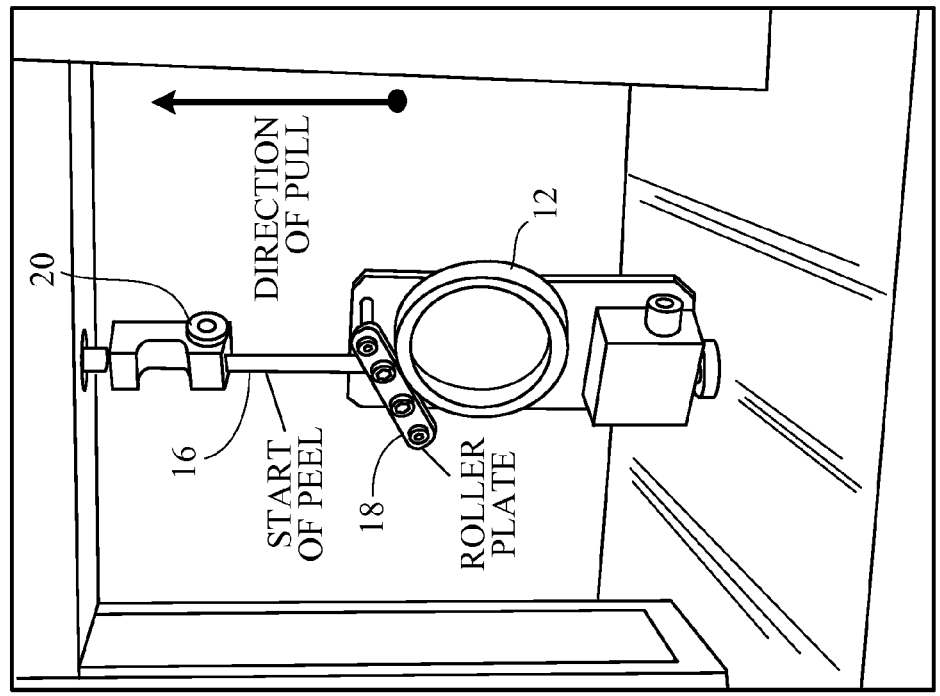
FIGS. 2 and 2a are schematics of a ring specimen mounted on a jog.
Figure 2:
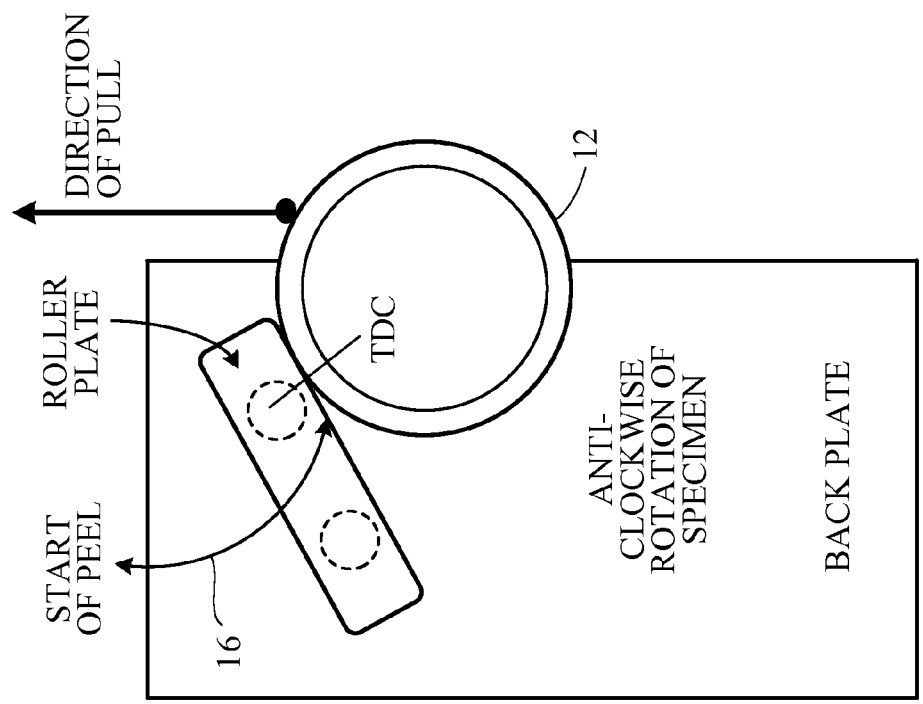

Mount the test piece in the jig as shodwn in FIGS. 2 and 2a.

The skin is then peeled from the pipe at a separation rate of 100 mm/min and a trace recorded of load versus time.

The average value of the load required to peel the skin sample is calculated (Newtons), and divided by the true width of the peel sample to obtain the test result (Newtons/millimeter).

The average of the 10 peak load values recorded is calculated (Newtons), and divided by the true width of the peel sample to obtain the test result (Newtons/millimeter).

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent, or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A plastics pipe which comprises an inner core and an outer removable skin layer bonded thereto,
   the inner core comprising polyethylene,
   the outer removable skin layer comprising an adherent polymeric material comprising a propylene block co-polymer, chosen for its physical and mechanical properties, and an appropriate amount of an adhesion-reducing additive,
   the adhesion-reducing additive being present in the skin layer in an amount such that the adhesion of the skin layer to the inner core is sufficient to prevent substantial undesired relative movement between the skin layer and the core during installation, but insufficient to prevent the outer skin layer from being cleanly removed by peeling, at least at the ends of the pipe, and insufficient to cause a substantial reduction in the impact strength of the inner core,
   wherein the adhesion reducing additive is an ester of glycerol with erucic acid, stearic acid, lauric acid, linoleic acid, myristic acid, oleic acid, palmitic acid, ricinoleic acid or behenic acid, or a fatty acid amide selected from oleamide, stearamide, erucamide, behemamide and ethylene-bis-stearamide
   wherein the adhesion-reducing additive in the skin layer is present in an amount of from 0.5% to 10% by weight; and the skin layer has a thickness of from 0.3 to 2.0 mm such that the adhesive bond between the skin layer and the inner core having a strength of from 0.2 N/mm to 2.0 N/mm, when measured by a rolling drum peel test as described in Appendix 1.

2. A plastics pipe according to claim 1, wherein the strength of the adhesive bond between the skin layer and the inner core is from 0.3 N/mm to 1.5 N/mm, when measured by a rolling drum peel test as described in Appendix 1.

3. A plastics pipe according to claim 1, in which the strength of the adhesive bond between the skin layer and the inner core is such that the impact strength of the composite pipe is at least 50% of the impact strength of the inner core without the skin layer.

4. A plastics pipe according to claim 1, in which the inner core comprises polyethylene and the skin layer comprises a propylene block co-polymer and wherein the impact strength of the pipe is greater than 300 joules, when measured using the method of EN1411:1996 at a temperature of −10° C. using a 90mm tup for impacting the pipe.

5. A plastics pipe according to claim 1, wherein the ester of glycerol is a fatty acid ester.

6. A plastics pipe according to claim 1, wherein the adhesion-reducing additive is glycerol mono-stearate.

7. A plastics pipe according to claim 1, which comprises an inner core of polyethylene and the skin layer of the propylene block copolymer comprises from 2% to 4% of the ester of glycerol.

8. A plastics pipe according to claim 1, wherein the ratio of the external diameter of the pipe to the thickness of the skin layer is from 100 to 800.

9. A plastics pipe according to claim 1, wherein the strength (in N per mm of width) of the skin layer exceeds the peel strength (in N per mm width) of the adhesive bond between the outer removable skin layer and the inner core.

10. A method for the production of a plastics pipe comprising an inner core and an outer removable skin layer bonded thereto, the inner core comprising polyethylene, the outer removable skin layer comprising a polymeric material, comprising a propylene block co-polymer, chosen for its physical and mechanical properties, and an appropriate amount of an adhesion-reducing additive, which method comprises co-extruding molten polymeric materials forming the inner core and the outer removable skin layer from one or more extruder dies, bringing the molten polymeric materials together and allowing them to cool, such that, on cooling, the adhesion of the skin layer to the inner core is sufficient to prevent substantial undesired relative movement between the skin layer and the core during installation of the pipe, but insufficient to prevent the skin layer from being cleanly removed by peeling, at least at the ends of the pipe, and insufficient to cause a substantial reduction in the impact strength of the inner core,
- wherein the adhesion reducing additive is an ester of glycerol with erucic acid, stearic acid, lauric acid, linoleic acid, myristic acid, oleic acid, palmitic acid, ricinoleic acid or behenic acid, or a fatty acid amide selected from oleamide, stearamide
- wherein the adhesion-reducing additive in the skin layer is present in an amount of from 0.5% to 10% by weight; and the skin layer has a thickness of from 0.3 to 2.0 mm such that the adhesion between the skin layer and the inner core having a strength of from 0.2 N/mm to 2.0 N/mm, when measured by a rolling drum peel test as described in Appendix 1.

11. A method according to claim 10, wherein the polymeric materials of the inner core and the outer removable skin layer are extruded simultaneously and brought together whilst still molten.

12. A method of making a joint to a plastics pipe according to claim 1, or of joining two such plastics pipes, which comprises peeling the skin layer from the region or regions of the pipe to be joined, to expose a clean surface suitable for electrofusion jointing, installing an electrofusion fitting over the clean surface or surfaces of the pipe or pipes and activating the electrofusion fitting to fuse the region or regions of the pipe or pipes thereto.

13. A plastics pipe according to claim 3, in which the strength of the adhesive bond between the skin layer and the inner core is such that the impact strength of the composite pipe is at least 75% of the impact strength of the inner core without the skin layer.

14. A plastics pipe according to claim 1, wherein
- the skin layer comprises a propylene block co-polymer;
- the inner core comprises polyethylene; and
- the impact strength of the pipe is greater than 300 joules, when measured using the method of EN1411:1996 at a temperature of $-10°$ C. using a 90mm tup for impacting the pipe.

15. A plastics pipe according to claim 1, wherein the adhesion reducing additive is ethylene-bis-stearamide.

* * * * *

UNITED STATES PATENT AND TRADEMARK OFFICE
CERTIFICATE OF CORRECTION

| | |
|---|---|
| PATENT NO. | : 8,685,508 B2 |
| APPLICATION NO. | : 10/525095 |
| DATED | : April 1, 2014 |
| INVENTOR(S) | : Jeremy Bowman |

It is certified that error appears in the above-identified patent and that said Letters Patent is hereby corrected as shown below:

In the Claims:

In Col. 10, Line 22, delete "behemamide" and insert -- behenamide --, therefor.

Signed and Sealed this
First Day of July, 2014

Michelle K. Lee
*Deputy Director of the United States Patent and Trademark Office*

UNITED STATES PATENT AND TRADEMARK OFFICE
CERTIFICATE OF CORRECTION

PATENT NO.       : 8,685,508 B2                                    Page 1 of 1
APPLICATION NO. : 10/525095
DATED            : April 1, 2014
INVENTOR(S)      : Jeremy Bowman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1449 days.

Signed and Sealed this
Thirtieth Day of May, 2017

Michelle K. Lee
*Director of the United States Patent and Trademark Office*